US012771055B2

(12) United States Patent
Matsuo

(10) Patent No.: US 12,771,055 B2
(45) Date of Patent: Oct. 20, 2026

(54) CONNECTION TERMINAL WITH PLURALITY OF BENDING PARTS HAVING THIN-WALLED PORTIONS

(71) Applicant: Yazaki Corporation, Tokyo (JP)

(72) Inventor: Takahiro Matsuo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 343 days.

(21) Appl. No.: 18/645,930

(22) Filed: Apr. 25, 2024

(65) Prior Publication Data

US 2024/0291188 A1 Aug. 29, 2024

Related U.S. Application Data

(63) Continuation of application No. PCT/JP2022/047136, filed on Dec. 21, 2022.

(30) Foreign Application Priority Data

Jan. 18, 2022 (JP) ................................ 2022-005546

(51) Int. Cl.
*H01R 13/11* (2006.01)
*H01R 4/18* (2006.01)

(52) U.S. Cl.
CPC .............. *H01R 13/11* (2013.01); *H01R 4/187* (2013.01)

(58) Field of Classification Search
None
See application file for complete search history.

(56) References Cited

U.S. PATENT DOCUMENTS 5,112,254 A * 5/1992 Endo ...................... H01R 43/16 439/852
5,643,018 A * 7/1997 Sakai ................ H01R 13/5208 439/852
5,666,723 A * 9/1997 Ohtaka ................ H01R 13/113 29/874
5,897,405 A * 4/1999 Endo ...................... H01R 13/11 439/852
6,095,874 A 8/2000 Quaranta

FOREIGN PATENT DOCUMENTS

DE 10252801 B4 * 2/2011 ........... H01R 13/114
JP 11-345645 A 12/1999

* cited by examiner

*Primary Examiner* — Tho D Ta
(74) *Attorney, Agent, or Firm* — Sughrue Mion, PLLC

(57) ABSTRACT

A connection terminal includes an electric wire connection part to which an electric wire is electrically connected by ultrasonic bonding, and an electric connection part integrated with the electric wire connection part and electrically connected to a mating terminal. The electric connection part includes a box unit which is formed in a cylindrical shape by bending a plurality of bending parts and into which the mating terminal is capable of being inserted, and a thin-walled portion having a thickness less than other parts of the box unit is continuously provided along each of the bending parts, and at least one of the thin-walled portions is arranged at a distance from an end portion of the box unit.

5 Claims, 3 Drawing Sheets

CONNECTION TERMINAL WITH PLURALITY OF BENDING PARTS HAVING THIN-WALLED PORTIONS

CROSS-REFERENCE TO RELATED APPLICATIONS

The present application is a continuation of International Application No. PCT/JP2022/047136, filed on Dec. 21, 2022, and based upon and claims the benefit of priority from Japanese Patent Application No. 2022-005546, filed on Jan. 18, 2022, the entire contents of which are incorporated herein by reference.

TECHNICAL FIELD

The present application relates to a connection terminal.

BACKGROUND

JP H11-345645 A (PTL 1) describes a connection terminal including an electric wire connection part to which an electric wire is electrically connected and an electric connection part integrated with the electric wire connection part and electrically connected to a mating terminal. In the connection terminal of PTL 1, the electric wire is electrically connected to the electric wire connection part by ultrasonic bonding.

In such a connection terminal, the electric connection part has a box unit which is formed in a cylindrical shape by bending at a plurality of bending parts and into which the mating terminal can be inserted. The box unit is bent at the plurality of bending parts to form the cylindrical shape, and its shape is held by applying laser spot welding to a part that can be opened.

SUMMARY

In the connection terminal as described in PTL 1, it is assumed that a thin-walled portion having a thickness less than other portions of the box unit is provided continuously along the bending part with respect to the plurality of bending parts. By providing a thin-walled portion, so called a pressed line, to the bending part, it is easy to perform a bending for the box unit, thereby improving a workability.

However, if the thin-walled portion is provided in the bending part, the strength of the bending part of the box unit decreases. Therefore, when the electric wire is ultrasonically bonded in the electric wire connection part, it is possible that the box unit is damaged by the vibration of the ultrasonic wave. In addition, depending on the joining material and method of welding for the box unit, the strength for ultrasonic bonding can be insufficient. If the joining material and method of welding are changed to satisfy the strength, the cost becomes high.

It is an object of the present application to provide a connection terminal capable of improving workability of a box unit and improving durability against ultrasonic bonding.

A connection terminal according to the present application includes an electric wire connection part to which an electric wire is electrically connected by ultrasonic bonding, and an electric connection part integrated with the electric wire connection part and electrically connected to a mating terminal. The electric connection part includes a box unit which is formed in a cylindrical shape by bending a plurality of bending parts and into which the mating terminal is capable of being inserted, and a thin-walled portion having a thickness less than other parts of the box unit is continuously provided along each of the bending parts, and at least one of the thin-walled portions is arranged at a distance from an end portion of the box unit.

According to the present application, it is possible to provide the connection terminal capable of improving workability of a box unit and improving durability against ultrasonic bonding.

DETAILED DESCRIPTION OF EMBODIMENTS

Figure 1:
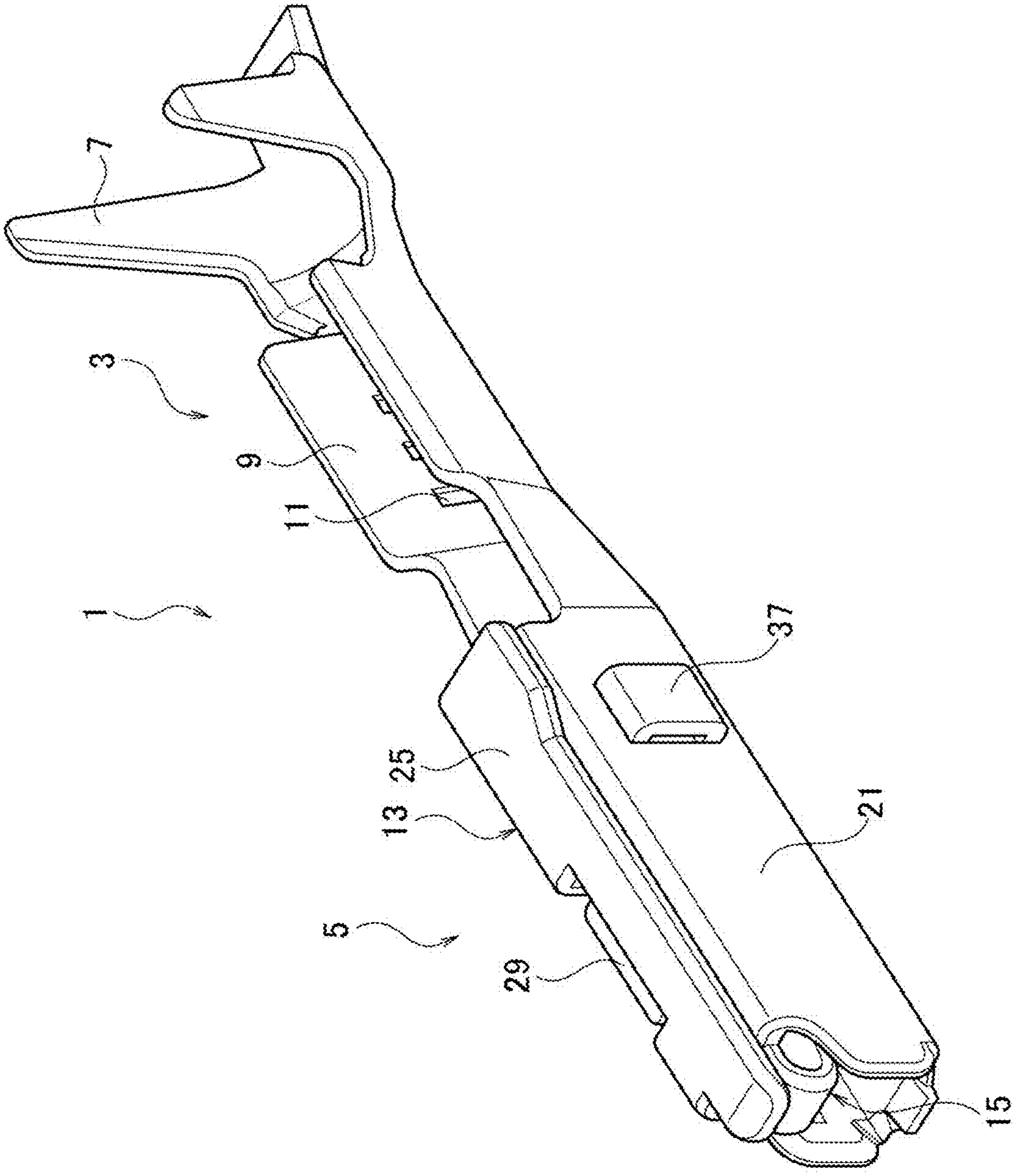
FIG. 1 is a perspective view of a connection terminal according to the present embodiment.

Hereinafter, a connection terminal according to the present embodiment will be described in detail with reference to the drawings.

A connection terminal 1 according to the present embodiment is received in a housing (not illustrated), for example, and constitutes a connector. The connector is fitted with a mating connector with a mating terminal received in a mating housing. By fitting the connector with the mating connector, the connection terminal 1 and the mating terminal are electrically connected.

Although not illustrated, the mating terminal is electrically connected to a wire by crimping or the like, for example, to a terminal part of the wire electrically connected to a power source or a device. The mating terminal is provided with a tab-like mating connection part extended along a mating direction between the connector and the mating connector. The connector and the mating connector are fitted, so that the mating connection part is inserted into an electric connection part 5 of the connection terminal 1 and the mating terminal is electrically connected to the connection terminal 1.

As illustrated in FIGS. 1 to 4, the connection terminal 1 is formed by punching and bending a sheet material made of a conductive material. The connection terminal 1 includes an electric wire connection part 3 and the electric connection part 5.

The electric wire connection part 3 includes a covering crimping part 7 and a core wire crimping part 9.

The covering crimping part 7 includes a pair of clamping pieces. The covering crimping part 7 clamps a covering part of an electric wire, for example, at a terminal part of an electric wire (not illustrated) electrically connected to a power source or a device. By clamping the covering crimping part 7 to the covering part of the electric wire, the connection terminal 1 is fixed to the electric wire.

The core wire crimping part 9 consists of a pair of crimping pieces provided between the electric connection part 5 and the covering crimping part 7. A plurality of serrations 11 are formed on an inner surface of the core wire crimping part 9 to destroy an oxide film formed on a core wire part of the electric wire. In the core wire crimping part 9, the core wire part exposed from the covering part of the electric wire is crimped by ultrasonic bonding at a terminal part of the electric wire. By crimping the core wire crimping part 9 to the core wire part of the electric wire, the connection terminal 1 is electrically connected to the electric wire.

The electric connection part 5 includes a box unit 13 and a spring part 15.

The box unit 13 is formed of a member in which a first wall part 17, a second wall part 19, a third wall part 21, a fourth wall part 23, and a fifth wall part 25 are continuously provided, and is formed into a rectangular cylindrical shape by performing bending at a plurality of bending parts 27. In the following, the positional relationship among the first wall part 17, the second wall part 19, the third wall part 21, the fourth wall part 23 and the fifth wall part 25 will be described as an example in this embodiment, but is not limited thereto.

The first wall part 17 is an upper wall arranged on an upper side in a height direction of the box unit 13. One side of the first wall part 17 in a width direction is connected to the third wall part 21 through the bending part 27, and the other side in the width direction is not provided with anything and opened. On the other side of the first wall part 17 in the width direction, a fixing projection 29 is formed by a protrusion outward in the width direction. On the first wall part 17, a regulating projection 31 for regulating excessive deformation of the spring part 15 is formed by a protrusion toward the inside of the box unit 13.

The second wall part 19 is a bottom wall arranged on a lower side in the height direction of the box unit 13. One side of the second wall part 19 in the width direction is connected to the third wall part 21 through the bending part 27, and the other side in the width direction is connected to the fourth wall part 23 through the bending part 27. A contact projection 33 that contacts with the tab-like mating connection part of the mating terminal is formed on the second wall part 19 by a protrusion toward the inside of the box unit 13.

The third wall part 21 is a side wall arranged on one side in the width direction of the box unit 13. One side of the third wall part 21 in the height direction of the box unit 13 (in the width direction of the third wall part 21) is connected to the first wall part 17 through the bending part 27, and the other side in the height direction of the box unit 13 (in the width direction of the third wall part 21) is connected to the second wall part 19 through the bending part 27. In the third wall part 21, an avoidance recess 35 for avoiding interference with the spring part 15 is formed by a recess so that a plate thickness is reduced. On the third wall part 21, a prevention projection 37 is formed by a projection toward the outside of the box unit 13. If the connection terminal 1 is inserted into the housing of the connector in an incorrect posture, the prevention projection 37 interferes with the housing to prevent the erroneous insertion of the connection terminal 1 into the housing.

The fourth wall part 23 is a side wall arranged on the other side in the width direction of the box unit 13. One side of the fourth wall part 23 in the height direction of the box unit 13 (in the width direction of the fourth wall part 23) is connected to the second wall part 19 through the bending part 27, and the other side in the height direction of the box unit 13 (in the width direction of the fourth wall part 23) is connected to the fifth wall part 25 through the bending part 27. In the fourth wall part 23, an avoidance recess 35 for avoiding interference with the spring part 15 is formed by a recess so that a plate thickness is reduced.

The fifth wall part 25 arranged on the upper side in the height direction of the box unit 13 is a superposed upper wall arranged on the upper side of the first wall part 17. One side of the fifth wall part 25 in the width direction is connected to the fourth wall part 23 through the bending part 27, and the other side in the width direction is not provided with anything and is opened. In the bending part 27 of the fifth wall part 25, a fixation hole 39 is formed through the fourth wall part 23 and the fifth wall part 25. The fixing projection 29 is inserted into the fixation hole 39 in a state that the box unit 13 is formed by bending, so that the shape of the box unit 13 is held. Further, after the box unit 13 is formed by bending, the fifth wall part 25 and the first wall part 17 may be welded and fixed by spot welding or the like.

The electric wire connection part 3 is connected to one end of the box unit 13 in a length direction, and the spring part 15 is connected to the other end of the box unit 13 in the length direction. More specifically, the electric wire connection part 3 is formed of a continuous member at the end portion of the second wall part 19, the third wall part 21 and the fourth wall part 23 in the length direction. The spring part 15 is formed of a continuous member at the end portion of the first wall part 17 in the length direction.

The spring part 15 is connected to the first wall part 17 of the box unit 13 on an end opposite to the electric wire connection part 3 in the length direction. The spring part 15 is bent toward the inside of the box unit 13 through a spring bend 41 to the first wall part 17, and is arranged inside the box unit 13 so that it can be elastically deformed. The spring part 15 includes a contact 43 formed wider than other parts and protruding toward the inside of the box unit 13. The contact 43 is arranged in the avoidance recesses 35 of the third wall part 21 and the fourth wall part 23 inside the box unit 13, so that interference with the third wall part 21 and the fourth wall part 23 due to elastic deformation of the spring part 15 is prevented.

When the connector and the mating connector are engaged with each other, the contact 43 contacts with the tab-like mating connection part of the mating terminal inserted into the box unit 13, so that the spring part 15 is elastically deformed. The elastically deformed spring part 15 makes the contact 43 contact with the mating connection part by an urging force to be restored, so that the connection terminal 1 is electrically connected with the mating terminal. At this time, the spring part 15 which is about to be excessively deformed contacts with the regulating projection 31, preventing excessive deformation, and the contact between the contact part 43 and the mating connection part is maintained. Moreover, the contact projection 33 is brought into contact with the mating connection part inserted into the box unit 13, so that reliability of the electric connection between the connection terminal 1 and the mating terminal can be maintained.

In the connection terminal 1, the plurality of bending parts 27 of the box unit 13 are provided with thin-walled portions 45 which are thinner than other parts of the box unit 13 in order to facilitate the bending. The thin-walled portions 45 are continuously formed along the bending parts 27 and are formed by so-called pressed line. The thin-walled portions 45 are formed, for example, half as thick as other parts of the box unit 13. By providing the thin-walled portions 45 in the bending parts 27, the strength of the bending parts 27 is lowered, so that the bending is easily performed and the workability can be improved. Further, the thickness of the thin-walled portions 45 can be set as appropriate in consideration of the strength and workability of the box unit 13.

In the connection terminal 1, the core wire part of the electric wire is connected to the electric wire connection part 3 by crimping by ultrasonic bonding. In the ultrasonic bonding, minute vibrations at high speed are generated during bonding. The vibration caused by the ultrasonic bonding greatly influences the box unit 13 of the electric connection part 5 located on the opposite side to the electric wire connection part 3 in the length direction of the connection terminal 1. The vibration in the ultrasonic bonding is generated in the width direction of the box unit 13 in order to stably crimp the core wire part of the electric wire and the core wire crimping part 9 of the electric wire connection part 3. At this time, as illustrated by solid lines in FIGS. 3 and 4, the first wall part 17 and the fifth wall part 25, which are arranged to be superposed, are opened on one side in the width direction, so that the deformation of the third wall part 21 and the fourth wall part 23 caused by the vibration of the ultrasonic bonding becomes large. As illustrated by the solid line in FIG. 3, if the vibration is applied in a direction in which the fifth wall part 25 located on the upper side of the first wall part 17 is moved away from the first wall part 17, the deformation of the third wall part 21 and the fourth wall part 23 becomes large. On the other hand, as illustrated by the solid line in FIG. 4, if the vibration is applied in a direction in which the fifth wall part 25 moves closer to the first wall part 17, the deformation of the third wall part 21 and the fourth wall part 23 becomes small.

Conventionally, the thin-walled portions 45 are provided over the entire area in the length direction of the bending parts 27. When the thin-walled portions 45 are provided in this manner, the strength of the bending parts 27 are lower than that of other parts of the box unit 13 over the entire area in the length direction. As a result, vibration caused by the ultrasonic bonding could generate breakage starting at the bending parts 27. Therefore, the thin-walled portions 45 are arranged in the bending parts 27 to improve durability against vibration caused by the ultrasonic bonding.

Figure 2:
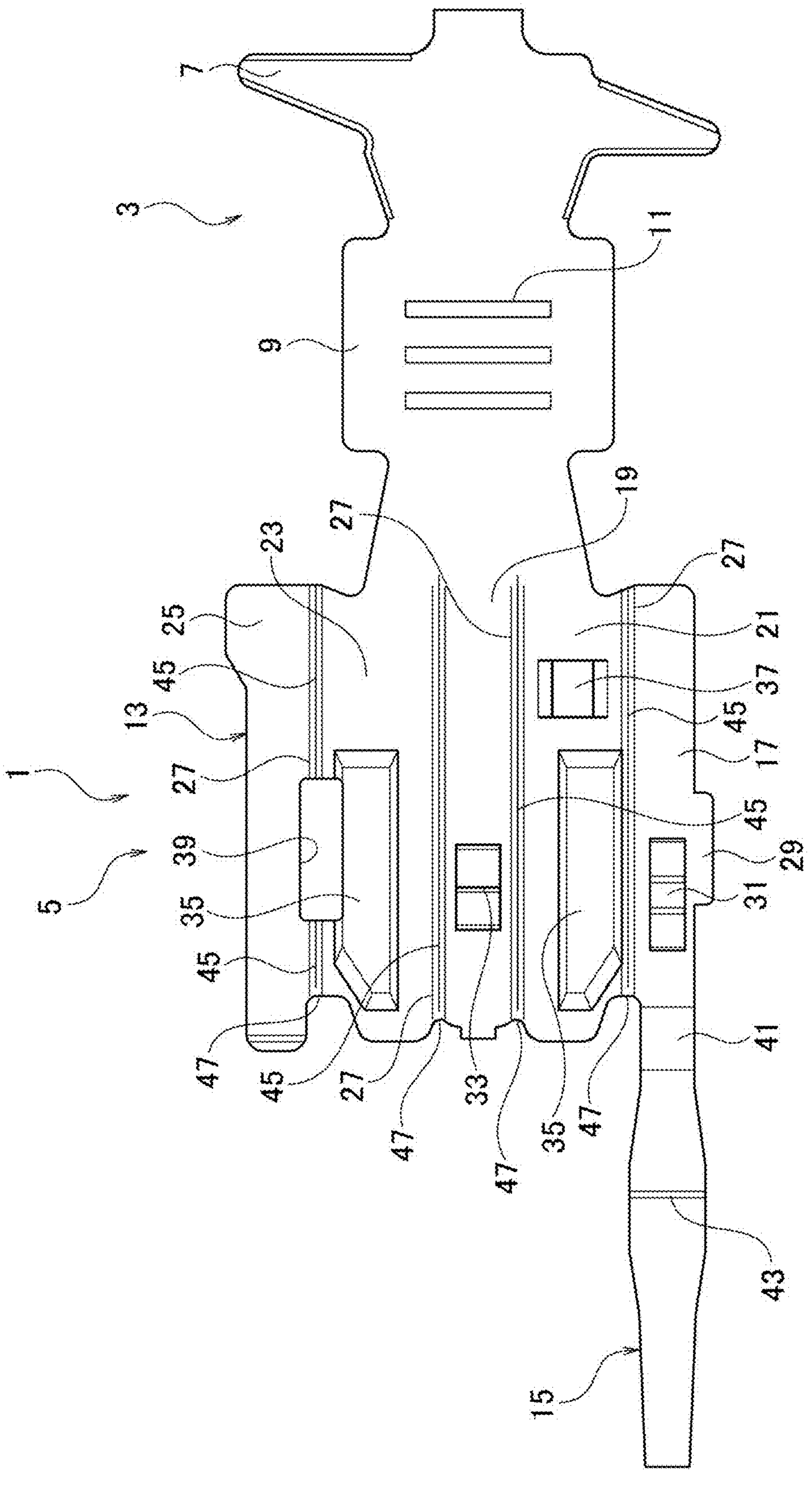
FIG. 2 is an expanded plan view of the connection terminal according to the present embodiment is expanded.
Figure 3:
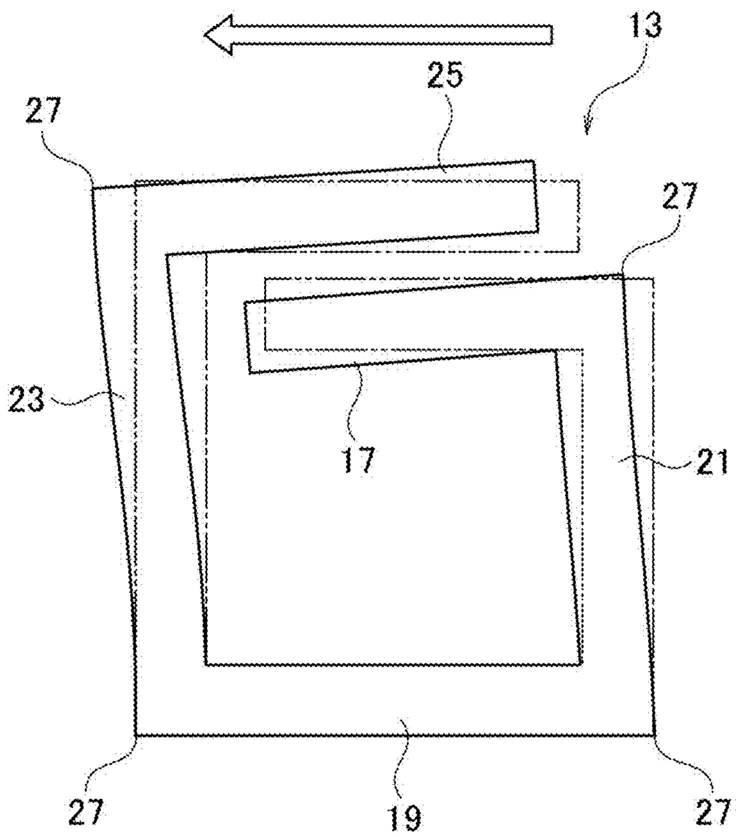
FIG. 3 is a schematic view of a case where vibration is generated toward one side in the width direction of a box unit when an electric wire is ultrasonically bonded to an electric wire connection part of the connection terminal according to the present embodiment.
Figure 4:
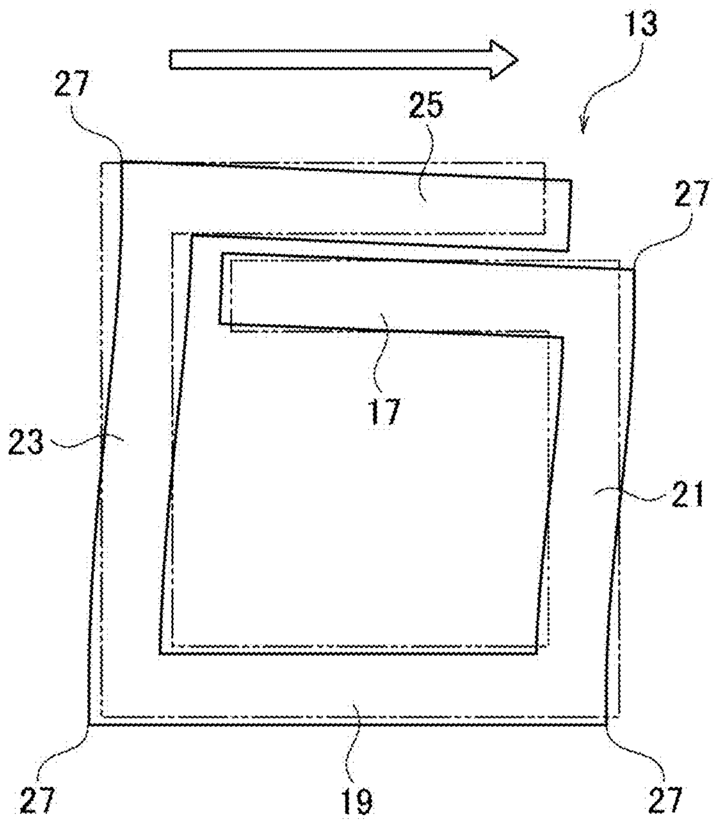
FIG. 4 is a schematic view of a case where vibration is generated toward the other side in the width direction of a box unit when an electric wire is ultrasonically bonded to the electric wire connection part of the connection terminal according to the present embodiment.

As illustrated in FIG. 2, the thin-walled portions 45 are arranged in the bending part 27 at a distance by a predetermined length from end portion 47 located on an opposite side to the electric wire connection part 3. By arranging the thin-walled portions 45 at a distance from the end portion 47 of the box unit 13, the strength of the bending parts 27 increases. Therefore, durability against ultrasonic bonding can be improved in the bending parts 27. In particular, since the end portion 47 of the box unit 13 on the opposite side to the electric wire connection part 3 is opened far away from the electric wire connection part 3, it is greatly influenced by the vibration caused by the ultrasonic bonding. Therefore, by arranging the thin-walled portions 45 at a distance from the end portion 47 on the opposite side to the electric wire connection part 3 of the box unit 13, the strength of the end portion 47 on the opposite side to the electric wire connection part 3 of the box unit 13 can be increased, and the durability against vibration caused by the ultrasonic bonding can be effectively improved. Further, the end portions of the box unit 13 arranged at a distance from the thin-walled portions 45 are not limited to the end portion 47 on the opposite side to the electric wire connection part 3, but may be an end portion on the side of the electric wire connection part 3. Furthermore, a predetermined length by which the thin-walled portions 45 are arranged at a distance from the end portion 47 of the box unit 13 may be set as appropriate to provide workability and durability in consideration of the material to be used, the thickness of the material, the thickness of the thin-walled portions 45, the length of the box unit 13, the width of the box unit 13, and the like.

Preferably, a thin-walled portions 45 arranged at a distance from the end portion 47 of the box unit 13 is arranged at least on the bending part 27 among the plurality of bending parts 27 of the first wall part 17 that has the spring bend 41 to which the spring part 15 is connected. The thin-walled portion 45 arranged in the bending part 27 of the first wall part 17 connected to the spring part 15 is arranged at a distance from the end portion 47 of the box unit 13, so that it is possible to suppress the influence caused by the vibration of the ultrasonic connection to the spring part 15. As a result, it is possible to suppress the breakage in the spring part 15 and maintain reliability of the electric connection of the connection terminal 1. Further, for example, if the spring part 15 is connected to the second wall part 19, at least the thin-walled portion 45 arranged in the bending part 27 of the second wall part 19 may be arranged at a distance from the end portion 47 of the box unit 13.

The first wall part 17 and the fifth wall part 25 constituting the box unit 13 are connected to the third wall part 21 and the fourth wall part 23 that are provided with the bending part 27 only on one side in the width direction, and the other side in the width direction is opened. Therefore, in the box unit 13, when the vibration caused by the ultrasonic bonding is applied, the other sides of the first wall part 17 and the fifth wall part 25 opened in the width direction vibrate more than the connected parts. Therefore, the thin-walled portion 45 arranged at a distance from the end portion 47 of the box unit 13 is preferably arranged in the bending part 27 on one side in the width direction, which is the connected portion of the first wall part 17 and the fifth wall part 25. By arranging the thin-walled portions 45 arranged at a distance from the end portion 47 of the box unit 13 in the bending parts 27 that are the connected portions of the first wall part 17 and the fifth wall part 25, the strength of the connected portions of the first wall part 17 and the fifth wall part 25 increases. As a result, it is possible to suppress the vibration of the open portions of the first wall part 17 and the fifth wall part 25 caused by the ultrasonic bonding, thereby improving the durability of the box unit 13. In addition, the spring part 15 is connected to the first wall part 17. By arranging the thin-walled portion 45 arranged at a distance from the end portion 47 of the box unit 13 at the bending part 27 that is the connected portion of the first wall part 17, it is possible to suppress the influence of the vibration of the ultrasonic connection to the spring part 15 and maintain reliability of the electric connection of the connection terminal 1.

The propagation of vibration caused by the ultrasonic bonding to the first wall part 17 and the fifth wall part 25 starts from the bending parts 27 of the second wall part 19 to which the third wall part 21 and the fourth wall part 23 are connected on both sides in the width direction. Therefore, the thin-walled portions 45 arranged at a distance from the end portion 47 of the box unit 13 are preferably arranged in the bending parts 27 on both sides of the second wall part 19 in the width direction, from which the propagation of vibration starts. The thin-walled portions 45 arranged at a distance from the end portion 47 of the box unit 13 are preferably arranged in the bending parts 27 of the second wall part 19, so that the strength of the bending parts 27 of the second wall part 19 increase. Therefore, propagation of vibration caused by the ultrasonic bonding to the first wall part 17 and the fifth wall part 25 which are opened on one side in the width direction, can be suppressed, and the durability of the box unit 13 can be improved.

The connection terminal 1 includes the electric wire connection part 3 to which the electric wire is electrically connected by ultrasonic bonding, and the electric connection part 5 integrated with the electric wire connection part 3 and electrically connected to the mating terminal. Further, the electric connection part 5 includes the box unit 13 formed in a cylindrical shape by being bent at the plurality of bending parts 27 to allow insertion of the mating terminal. Moreover, the thin-walled portions 45 having a thickness less than other parts of the box unit 13 are provided continuously along the bending parts 27. At least one of the plurality of thin-walled portions 45 is arranged at a distance from the end portion 47 of the box unit 13.

Among the plurality of bending parts 27, the strength of the bending part 27 in which the thin-walled portion 45 is arranged at a distance from the end portion 47 of the box unit 13, can be increased. Therefore, the thin-walled portions 45 are provided in the bending parts 27 to improve workability, and durability against the ultrasonic bonding can be improved to suppress the breakage of the box unit 13 due to the ultrasonic bonding. In addition, even in the case of welding the box unit 13, an inexpensive bonding material or a simple method for welding the box unit 13 can be applied, and the cost can be reduced.

Therefore, in the connection terminal 1, the workability of the box unit 13 can be improved, and the durability against the ultrasonic bonding can be improved.

The end portion 47 of the box unit 13 arranged at a distance from the thin-walled portions 45 is an end portion 47 located on the opposite side to the electric wire connection part 3. Therefore, the strength of the end portion 47 on the opposite side to the electric wire connection part 3 of the box unit 13, which is greatly influenced by the vibration caused by ultrasonic bonding, can be increased, and the durability against the ultrasonic bonding can be effectively improved.

The electric connection part 5 has the spring part 15 arranged inside the box unit 13 so that it can be elastically deformed and contacted with the mating terminal. The spring part 15 is connected to the end portion of the box unit 13 and is bent toward the inside of the box unit 13 at the spring bend 41. The thin-walled portion 45 arranged at a distance from the end portion 47 of the box unit 13 is arranged in the bending part 27 of the first wall part 17 as a wall part provided with the spring bend 41 in the box unit 13. Therefore, the strength of the bending part 27 of the first wall part 17 to which the spring part 15 is connected can be increased, so that the influence of ultrasonic bonding on the spring part 15 can be suppressed and reliability of the electric connection can be maintained.

The box unit 13 has the first wall part 17 as an open wall part provided with the bending part 27 on one side in the width direction and opened on the other side in the width direction. The first wall part 17 is provided with the spring bend 41. The thin-walled portion 45 arranged at a distance from the end portion 47 of the box unit 13 is arranged in the bending part 27 of the first wall part 17. Therefore, the strength of the connected part of the first wall part 17 can be increased, so that the influence of the ultrasonic bonding to the open part of the first wall part 17 can be suppressed, and the durability of the box unit 13 can be improved. In addition, the influence of vibration of the ultrasonic bonding to the spring part 15 can be suppressed, and reliability of the electric connection can be maintained.

The box unit 13 has the second wall part 19 as a connecting wall part provided with each of the bending parts 27 on both sides in the width direction. The thin-walled portions 45 arranged at a distance from the end portion 47 of the box unit 13 are arranged in each bending part 27 of the second wall part 19. Therefore, the strength of the bending parts 27 of the second wall part 19, from which the propagation of vibration caused by the ultrasonic bonding start, can be increased, so that the propagation of vibration caused by the ultrasonic bonding to the open part of the box unit 13 can be suppressed, and the durability of the box unit 13 can be improved.

Although the present embodiment has been described above, the present embodiment is not limited thereto, and various variations are possible within the scope of the outline of the present embodiment.

For example, the connection terminal 1 according to the present embodiment is electrically connected to the mating terminal by fitting the connector to the mating connector, but not limited thereto. A direct electric connection between the connection terminal 1 and the mating terminal is also possible.

The box unit 13 is formed in a rectangular cylindrical shape, but not limited thereto. The cylindrical shape of the box unit may include any shape, such as a hexagonal cylindrical shape or other polygonal cylindrical shape.

In the present embodiment, the thin-walled portions 45 arranged at a distance from the end portion 47 of the box unit 13 are arranged in all of the plurality of bending parts 27, but not limited thereto. For example, a thin-walled portion 45 arranged at a distance from the end portion 47 of the box unit 13 may be arranged only in the bending part 27 of the first wall part 17 or only in the bending part 27 of the second wall part 19.

The thin-walled portion 45 is not necessarily arranged on the end portion 47 on the opposite side to the electric wire connection part 3 of the box unit 13, but may be arranged on the end portion on the side of the electric wire connection part 3 of the box unit 13 at a distance from the end portion.

The invention claimed is:

1. A connection terminal, comprising:

an electric wire connection part to which an electric wire is electrically connected by ultrasonic bonding, and an electric connection part integrated with the electric wire connection part and electrically connected to a mating terminal, wherein the electric connection part includes a box unit which is formed in a cylindrical shape by bending a plurality of bending parts and into which the mating terminal is capable of being inserted, the box unit extending along a length direction, a thin-walled portion having a thickness less than other parts of the box unit is continuously provided along each of the bending parts, and at least one of the thin-walled portions is arranged at a distance in the length direction from an end portion of at least one of the bending parts of the box unit respectively.

2. The connection terminal according to claim 1, wherein the end portion of the at least one bending part arranged at the distance from the thin-walled portion is an end portion located on an opposite side of the electric wire connection part.

3. The connection terminal according to claim 1, wherein the electric connection part includes a spring part arranged inside the box unit so that the spring part is capable of being elastically deformed and contacted with the mating terminal, the spring part is connected to an end portion of the box unit and is bent toward the inside of the box unit at a spring bend, and the thin-walled portion arranged at the distance from the end portion of the at least one bending part is arranged in the bending part of a wall part provided with the spring bend in the box unit.

4. The connection terminal according to claim 3, wherein the box unit includes an open wall part provided with the bending part on one side in a width direction and opened on the other side in the width direction, the open wall part is provided with the spring bend, and the thin-walled portion arranged at the distance from the end portion of the at least one bending part is arranged in the bending part of the open wall part.

5. The connection terminal according to claim 1, wherein the box unit includes a connecting wall part provided with each bending part on both sides in a width direction, and the thin-walled portion arranged at the distance from the end portion of the at least one bending part is arranged in each bending part of the connecting wall part.

* * * * *